(12) United States Patent
Affinito

(10) Patent No.: US 6,207,239 B1
(45) Date of Patent: *Mar. 27, 2001

(54) PLASMA ENHANCED CHEMICAL DEPOSITION OF CONJUGATED POLYMER

(75) Inventor: John D. Affinito, Kennewick, WA (US)

(73) Assignee: Battelle Memorial Institute, Richland, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/212,781

(22) Filed: Dec. 16, 1998

(51) Int. Cl.⁷ .................................................. C23C 16/505

(52) U.S. Cl. .................. 427/488; 427/497; 427/506; 427/507; 427/509; 427/520; 427/255.6

(58) Field of Search ..................................... 427/488, 497, 427/506, 507, 509, 520, 255.6

(56) References Cited

U.S. PATENT DOCUMENTS

| | | | |
|---|---|---|---|
| 3,475,307 | * 10/1969 | Knox et al. | |
| 3,607,365 | 9/1971 | Lindlof. | |
| 4,098,965 | 7/1978 | Kinsman. | |
| 4,283,482 | * 8/1981 | Hattori et al. | 430/296 |
| 4,581,337 | 4/1986 | Frey et al. | |
| 4,624,867 | 11/1986 | Iijima et al. | |
| 4,695,618 | 9/1987 | Mowrer. | |
| 4,842,893 | 6/1989 | Yializis et al. | 427/44 |
| 4,954,371 | * 9/1990 | Yializis | 427/497 |

(List continued on next page.)

FOREIGN PATENT DOCUMENTS

| | | |
|---|---|---|
| 0 299 753 | 1/1989 | (EP). |
| 0 340 935 | 11/1989 | (EP). |
| 0 390 540 | 10/1990 | (EP). |
| 0 547 550 | 6/1993 | (EP). |
| 0 722 787 | 7/1996 | (EP). |
| 787 826 | 8/1997 | (EP). |
| 0 916 394 | 5/1999 | (EP). |
| 0 977 469 | 2/2000 | (EP). |
| 63136316 | 6/1988 | (JP). |
| 08325713 | 12/1996 | (JP). |
| 09059763 | 3/1997 | (JP). |
| WO 87/078 | 12/1987 | (WO). |
| WO 95/10117 | 4/1995 | (WO). |
| WO 97/04885 | 2/1997 | (WO). |
| WO 97/22631 | 6/1997 | (WO). |
| WO 98/10116 | 3/1998 | (WO). |
| WO 98/18852 | 5/1998 | (WO). |
| WO 99 16931 | 4/1999 | (WO). |
| WO 99/16557 | 4/1999 | (WO). |
| WO 99/16931 | 4/1999 | (WO). |

OTHER PUBLICATIONS

Affinito, J.D., Gross, M.E., Coronado, C.A., Dunham, G.C., and Martin, P.M., "High Rate Vacuum Deposition of Polymer Electrolytes" Journal Vacuum Science Technology A 14(3), May/Jun. 1996, pp. 733–738.

Affinito, J.D. et al., "PML/oxide/PML barrier layer performance differences arising from use of UV or electron beam polymerization of the PML layers" Thin Solid Films, Elsevier Science S.A., vol. 308–309, Oct. 31, 1997, pp. 19–25.

(List continued on next page.)

Primary Examiner—Timothy Meeks
(74) Attorney, Agent, or Firm—Killworth, Gottman, Hagan & Schaeff, L.L.P.

(57) ABSTRACT

The method of the present invention has the steps of (a) flash evaporating a conjugated material in an evaporate outlet forming an evaporate; (b) passing the evaporate to a glow discharge electrode creating a glow discharge conjugated monomer plasma from the evaporate; and (c) cryocondensing the glow discharge conjugated monomer plasma on a substrate and crosslinking the glow discharge conjugated monomer plasma thereon, wherein the crosslinking results from radicals created in the glow discharge conjugated monomer plasma and achieves self curing.

51 Claims, 3 Drawing Sheets

U.S. PATENT DOCUMENTS

| | | |
|---|---|---|
| 5,032,461 | 7/1991 | Shaw et al. . |
| 5,237,439 | 8/1993 | Misono et al. . |
| 5,260,095 | 11/1993 | Affinito . |
| 5,354,497 | 10/1994 | Fukuchi et al. . |
| 5,395,644 | 3/1995 | Affinito . |
| 5,427,638 | 6/1995 | Goetz et al. . |
| 5,440,446 | 8/1995 | Shaw et al. . |
| 5,536,323 | 7/1996 | Kirlin et al. . |
| 5,547,508 | 8/1996 | Affinito . |
| 5,554,220 | 9/1996 | Forrest et al. . |
| 5,576,101 | 11/1996 | Saitoh et al. . |
| 5,607,789 | 3/1997 | Treger et al. . |
| 5,620,524 | 4/1997 | Fan et al. . |
| 5,629,389 | 5/1997 | Roitman et al. . |
| 5,654,084 | 8/1997 | Egert . |
| 5,681,615 * | 10/1997 | Affinito et al. ............... 427/255.6 |
| 5,681,666 | 10/1997 | Treger et al. . |
| 5,684,084 | 11/1997 | Lewin et al. . |
| 5,686,360 | 11/1997 | Harvey, III et al. . |
| 5,693,956 | 12/1997 | Shi et al. . |
| 5,711,816 | 1/1998 | Kirlin et al. . |
| 5,725,909 | 3/1998 | Shaw et al. . |
| 5,731,661 | 3/1998 | So et al. . |
| 5,747,182 | 5/1998 | Friend et al. . |
| 5,757,126 | 5/1998 | Harvey, III et al. . |
| 5,759,329 | 6/1998 | Krause et al. . |
| 5,792,550 | 8/1998 | Phillips et al. . |
| 5,811,177 | 9/1998 | Shi et al. . |
| 5,811,183 | 9/1998 | Shaw et al. . |
| 5,821,692 | 10/1998 | Rogers et al. . |
| 5,844,363 | 12/1998 | Gu et al. ............... 313/506 |
| 5,872,355 | 2/1999 | Hueschen . |
| 5,902,641 * | 5/1999 | Affinito et al. ............ 427/255.32 |
| 5,902,688 | 5/1999 | Antoniadis et al. . |
| 5,904,958 | 5/1999 | Dick et al. . |
| 5,912,069 | 5/1999 | Yializis et al. . |
| 5,922,161 | 7/1999 | Wu et al. . |
| 5,945,174 | 8/1999 | Shaw et al. . |
| 5,948,552 | 9/1999 | Antoniadis et al. . |
| 5,965,907 | 10/1999 | Huang et al. . |
| 5,996,498 | 12/1999 | Lewis . |
| 6,045,864 | 4/2000 | Lyons et al. . |
| 6,083,628 | 7/2000 | Yializis . |

OTHER PUBLICATIONS

Penning, F.M., "Electrical Discharges in Gasses", Gordon and Breach, Science Publishers, 1965, Chapters 5–6, pp. 19–35, and Chapter 8, pp. 41–50 (No Month).

Affinito, J.D. et al., "Vacuum Deposition of Polymer Electrolytes On Flexible Substrates" Proceedings of the Ninth International Conference on Vacuum Web Coating, Nov. 1995 ed R. Bakish, Bakish Press 1995, pp. 20–36.

Inoue et al., Proc. Jpn. Congr. Mater. Res., vol. 33, 1990, pp. 177–179 (No Month).

Vossen, J.L. et al., editors, "Thin Film Processes" Academic Press, 1978, Part II, Chapter 11–1, "Glow Discharge Sputter Deposition", pp. 12–63; Part IV–1"Plasma Deposition of Inorganic Thin Films", pp. 335–360, and Chapter IV–2 "Glow Discharge Polymerization" pp. 361–397 (no month).

PCT International Search Report for International application No. PCT/US 99/30069 dated Sep. 5, 2000.

G Gustafson, Y. Cao, G.M. Treacy, F. Klavetter, N. Colaneri, and A.J. Heeger, Nature, vol. 35, Jun. 11, 1992, pp. 477–479.

J.D. Affinito, M.E. Gross, C.A. Coronado, G.L. Graff, E.N. Greenwell, and P.M. Martin, Polymer–Oxide Transparent Barrier Layers Produced Using the PML Process, $39^{th}$ Annual Technical Conference Proceedings of the Society of Vacuum Coaters, Vacuum Web Coating Session, 1996, pp. 392–397, (No Month).

J.D. Affinito, Stephan, Eufinger, M.E. Gross, G.L. Graff, and P.M. Martin, PML/Oxide/PML Barrier Layer Performance Differences Arising From Use of UV or Electron Beam Polymerization of the PML Layers, Thin Solid Films, vol. 308, 1997, pp. 19–25, (No Month).

* cited by examiner

PLASMA ENHANCED CHEMICAL DEPOSITION OF CONJUGATED POLYMER

FIELD OF THE INVENTION

The present invention relates generally to a method of making plasma polymerized conjugated polymer films. More specifically, the present invention relates to making a plasma polymerized conjugated polymer film via plasma enhanced chemical deposition with a flash evaporated feed source of a low vapor pressure compound.

As used herein, the term "(meth)acrylic" is defined as "acrylic or methacrylic". Also, (meth)acrylate is defined as "acrylate or meth acrylate".

As used herein, the term "cryocondense" and forms thereof refers to the physical phenomenon of a phase change from a gas phase to a liquid phase upon the gas contacting a surface having a temperature lower than a dew point of the gas.

As used herein, the term "conjugated" refers to a chemical structure of alternating single and double bonds between carbon atoms in a carbon atom chain.

BACKGROUND OF THE INVENTION

The basic process of plasma enhanced chemical vapor deposition (PECVD) is described in THIN FILM PROCESSES, J. L. Vossen, W. Kern, editors, Academic Press, 1978, Part IV, Chapter IV - 1 Plasma Deposition of Inorganic Compounds, Chapter IV - 2 Glow Discharge Polymerization, herein incorporated by reference. Briefly, a glow discharge plasma is generated on an electrode that may be smooth or have pointed projections. Traditionally, a gas inlet introduces high vapor pressure monomeric gases into the plasma region wherein radicals are formed so that upon subsequent collisions with the substrate, some of the radicals in the monomers chemically bond or cross link (cure) on the substrate. The high vapor pressure monomeric gases include gases of $CH_4$, $SiH_4$, $C_2H_6$, $C_2H_2$, or gases generated from high vapor pressure liquid, for example styrene (10 torr at 87.4 EF (30.8 EC)), hexane (100 torr at 60.4 EF (15.8 EC)), tetramethyldisiloxane (10 torr at 82.9 EF (28.3 EC) 1,3,-dichlorotetra-methyidisiloxane) and combinations thereof that may be evaporated with mild controlled heating. Because these high vapor pressure monomeric gases do not readily cryocondense at ambient or elevated temperatures, deposition rates are low (a few tenths of micrometer/min maximum) relying on radicals chemically bonding to the surface of interest instead of cryocondensation. Remission due to etching of the surface of interest by the plasma competes with the reactive deposition. Lower vapor pressure species have not been used in PECVD because heating the higher molecular weight monomers to a temperature sufficient to vaporize them generally causes a reaction prior to vaporization, or metering of the gas becomes difficult to control, either of which is inoperative.

The basic process of flash evaporation is described in U.S. Pat. No. 4,954,371 herein incorporated by reference. This basic process may also be referred to as polymer multi-layer (PML) flash evaporation. Briefly, a radiation polymerizable and/or cross linkable material is supplied at a temperature below a decomposition temperature and polymerization temperature of the material. The material is atomized to droplets having a droplet size ranging from about 1 to about 50 microns. An ultrasonic atomizer is generally used. The droplets are then flash vaporized, under vacuum, by contact with a heated surface above the boiling point of the material, but below the temperature which would cause pyrolysis. The vapor is cryocondensed on a substrate then radiation polymerized or cross linked as a very thin polymer layer.

The material may include a base monomer or mixture thereof, crosslinking agents and/or initiating agents. A disadvantage of the flash evaporation is that it requires two sequential steps, cryocondensation followed by curing or cross linking, that are both spatially and temporally separate.

According to the state of the art of making plasma polymerized films, PECVD and flash evaporation or glow discharge plasma deposition and flash evaporation have not been used in combination. However, plasma treatment of a substrate using glow discharge plasma generator with inorganic compounds has been used in combination with flash evaporation under a low pressure (vacuum) atmosphere as reported in J. D. Affinito, M. E. Gross, C. A.. Coronado, and P. M. Martin, A Vacuum Deposition Of Polymer Electrolytes On Flexible Substrates. "Paper for Plenary talk in A Proceedings of the Ninth International Conference on Vacuum Web Coating", November 1995 ed R. Bakish, Bakish Press 1995, pg 20–36., and as shown in FIG. 1a. In that system, the plasma generator 100 is used to etch the surface 102 of a moving substrate 104 in preparation to receive the monomeric gaseous output from the flash evaporation 106 that cryocondenses on the etched surface 102 and is then passed by a first curing station (not shown), for example electron beam or ultra-violet radiation, to initiate cross linking and curing. The plasma generator 100 has a housing 108 with a gas inlet 110. The gas may be oxygen, nitrogen, water or an inert gas, for example argon, or combinations thereof. Internally, an electrode 112 that is smooth or having one or more pointed projections 114 produces a glow discharge and makes a plasma with the gas which etches the surface 102. The flash evaporator 106 has a housing 116, with a monomer inlet 118 and an atomizing nozzle 120, for example an ultrasonic atomizer. Flow through the nozzle 120 is atomized into particles or droplets 122 which strike the heated surface 124 whereupon the particles or droplets 122 are flash evaporated into a gas that flows past a series of baffles 126 (optional) to an outlet 128 and cryocondenses on the surface 102. Although other gas flow distribution arrangements have been used, it has been found that the baffles 126 provide adequate gas flow distribution or uniformity while permitting ease of scaling up to large surfaces 102. A curing station (not shown) is located downstream of the flash evaporator 106.

In the flash evaporation process using acrylate and/or methacrylate the starting monomer is a (meth)acrylate monomer (FIG. 1b). When $R_1$ is hydrogen (H), the compound is an acrylate and when $R_1$ is a methyl group ($CH_3$), the compound is a methacrylate. If the group $R_2$ pendant to the (meth)acrylate group is fully conjugated, the O—C— linkage interrupts the conjugation and renders the monomer non-conducting. Exposure to electron beam radiation, or UV in the presence of a photoinitiator, initiates polymerization of the monomer by creating free radicals at the (C=C) double bond in the (meth)acrylate linkage. After polymerization, the two (meth)acrylate Double (C=C) bonds, where the cross-linking occurred, have been converted to single (C—C) bonds. Thus, the cross-linking step further interrupts conjugation and makes conductivity impossible.

Therefore, there is a need for an apparatus and method for making plasma polymerized conjugated polymer layers at a fast rate but that is also self curing, preserving the conjugation.

SUMMARY OF THE INVENTION

The present invention is an improved method of plasma polymerization wherein a conjugated monomer is cured during plasma polymerization.

The present invention may be viewed from two points of view, vis(1 an apparatus and method for plasma enhanced chemical vapor deposition of conjugated low vapor pressure monomer or a mixture of monomer with particle materials onto a substrate, and (2) an apparatus and method for making self-curing conjugated or conductive polymer layers, especially self-curing PML polymer layers. As used herein, the term "conjugated polymer"or "fully conjugated polymer" is defined as a polymer having sufficient degree of conjugation to be electrically conductive when doped. Thus, either the monomer is fully conjugated or the particles either combine together or crosslink with the monomer in a manner to provide a "fully conjugated polymer".

From both points of view, the invention is a combination of flash evaporation with plasma enhanced chemical vapor deposition (PECVD) that provides the unexpected improvements of permitting use of low vapor pressure monomer conjugated materials in a PEDVD process and provides a self curing from a flash evaporation process, at a rate surprisingly faster than standard PECVD deposition rates.

Generally, the apparatus of the present invention is (a) a flash evaporation housing with a monomer atomizer for making monomer droplets, heated evaporation surface for making an evaporate from the monomer droplets, and an evaporate outlet, (b) a glow discharge electrode downstream of the evaporate outlet for creating a glow discharge plasma from the evaporate, wherein (c) the substrate is proximate the glow discharge plasma for receiving and cryocondensing the glow discharge plasma thereon. All components are preferably within a low pressure (vacuum) chamber.

The method of the present invention has the steps of (a) flash evaporating a liquid conjugated monomer an evaporate outlet forming an evaporate; (b) passing the evaporate to a glow discharge electrode creating a glow discharge conjugated monomer plasma from the evaporate; and (c) cryocondensing the glow discharge conjugated monomer plasma on a substrate whereupon condensed glow discharge conjugated monomer plasma as a liquid begins crosslinking. The crosslinking results from radicals created in the glow discharge plasma and achieves self curing.

It is an object of the present invention to provide a method of making a conjugated or conductive polymer.

An advantage of the present invention is that it is insensitive to a direction of motion of the substrate because the deposited conjugated monomer layer is self curing. A further advantage is that the conjugation is preserved during curing. In the prior art, the deposited monomer layer required a radiation curing apparatus so that the motion of the substrate had to be from the place of deposition toward the radiation apparatus and which interfered with conjugation as previously discussed. Another advantage of the present invention is that multiple layers of materials may be combined. For example, as recited in U.S. Pat. Nos. 5,547,508 and 5,395,644, 5,260,095, hereby incorporated by reference, multiple polymer layers, alternating layers of polymer and metal, and other layers may be made with the present invention in the vacuum environment.

The subject matter of the present invention is particularly pointed out and distinctly claimed in the concluding portion of this specification. However, both the organization and method of operation, together with further advantages and objects thereof, may best be understood by reference to the following detailed description in combination with the drawings wherein like reference characters refer to like elements.

FIG.. 1b is a chemical diagram of (meth)acrylate.

Figure 1A:
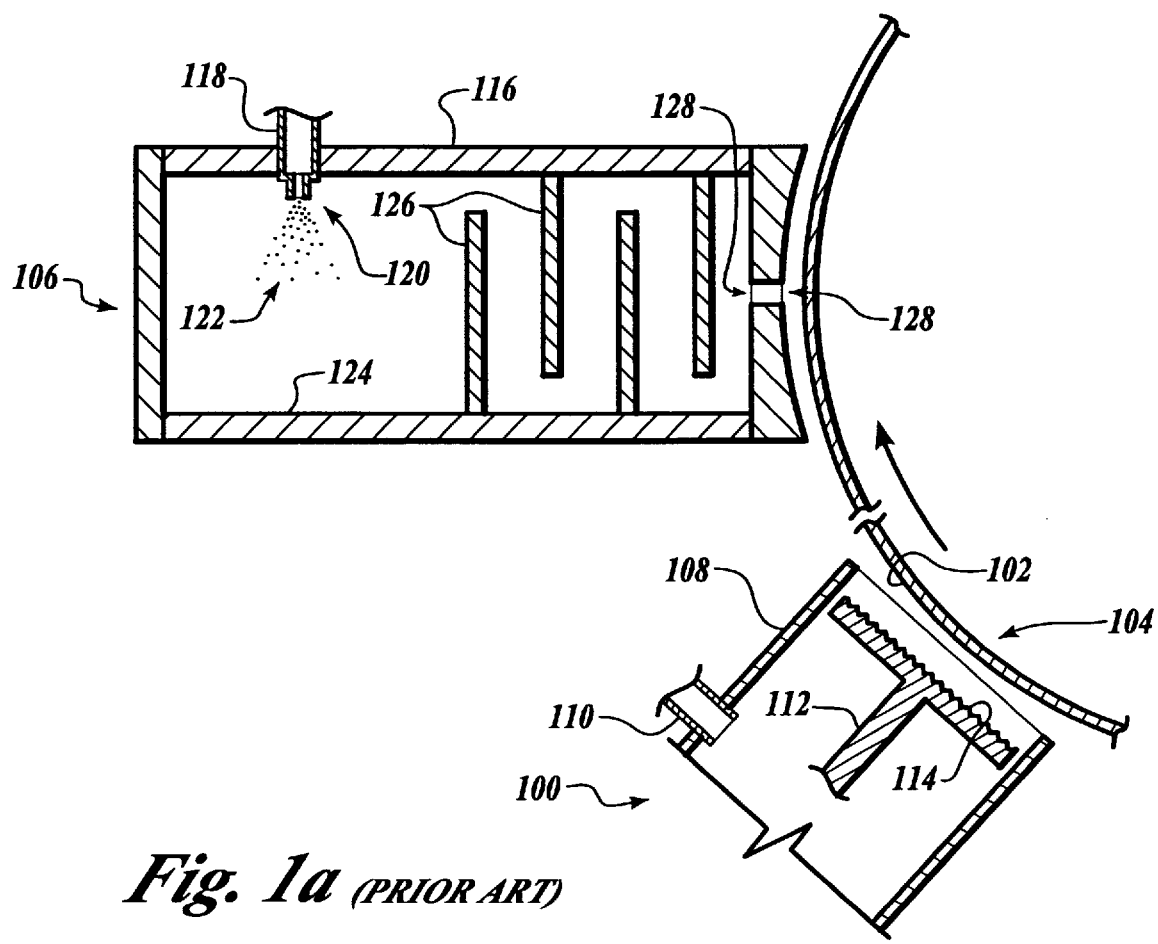
FIG. 1a is a cross section of a prior art combination of a glow discharge plasma generator with inorganic compounds with flash evaporation.
Figure 1B:
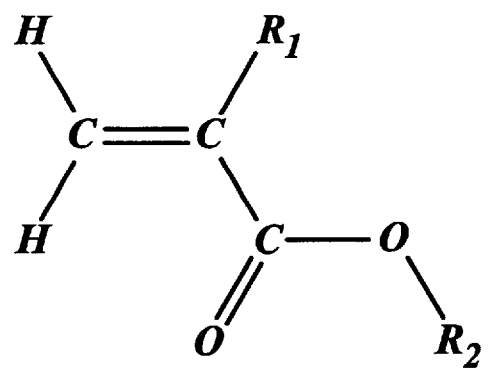
Figure 1C:
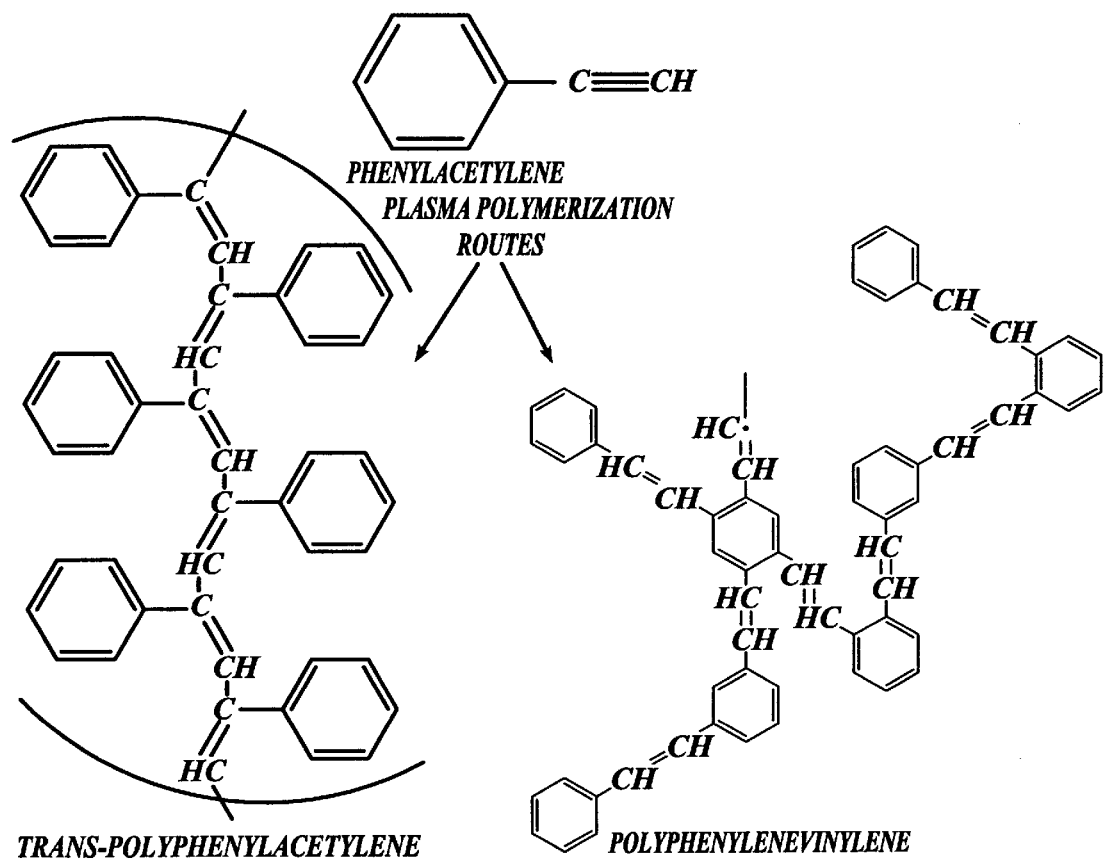

FIG. 1c is a chemical diagram of phenylacetylene and two plasma polymerization routes from phenylacetylene to conjugated polymer.

Figure 1D:
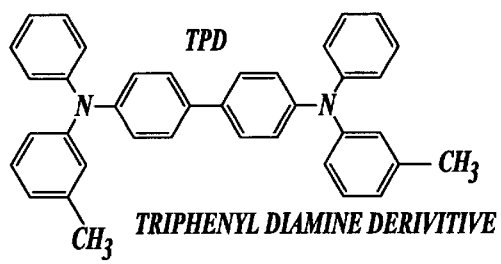

FIG. 1d is a chemical diagram of triphynyl diamine derivitive

Figure 1E:
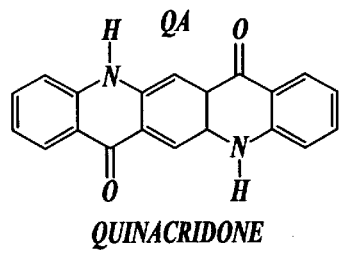

FIG. 1e is a chemical diagram of quinacridone.

Figure 2:
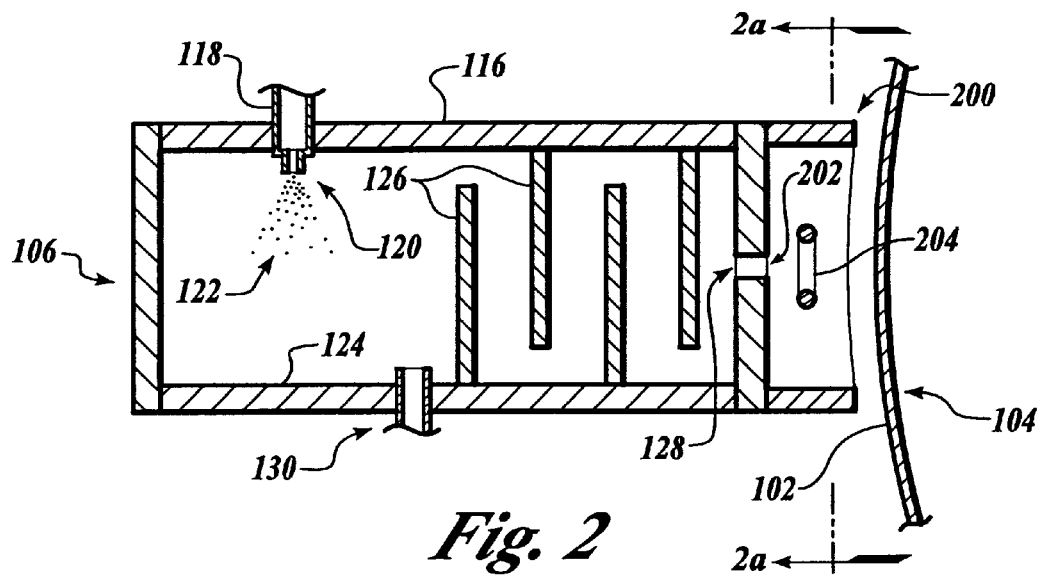

FIG. 2 is a cross section of the apparatus of the present invention of combined flash evaporation and glow discharge plasma deposition.

Figure 2A:
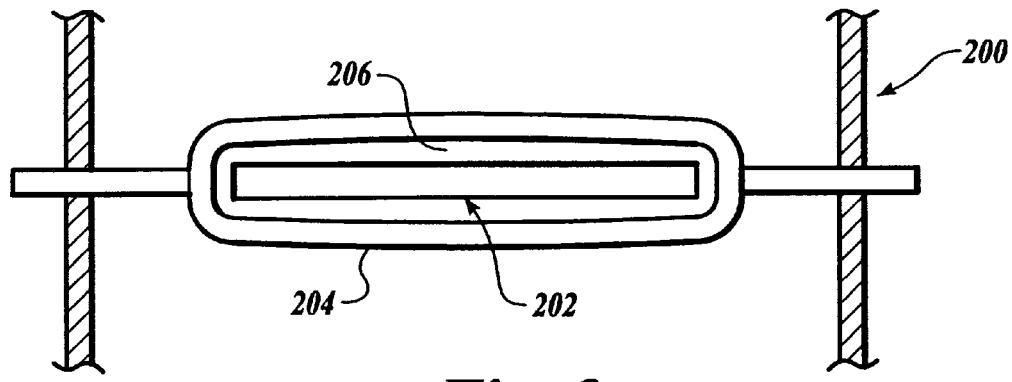

FIG. 2a is a cross section end view of the apparatus of the present invention.

Figure 3:
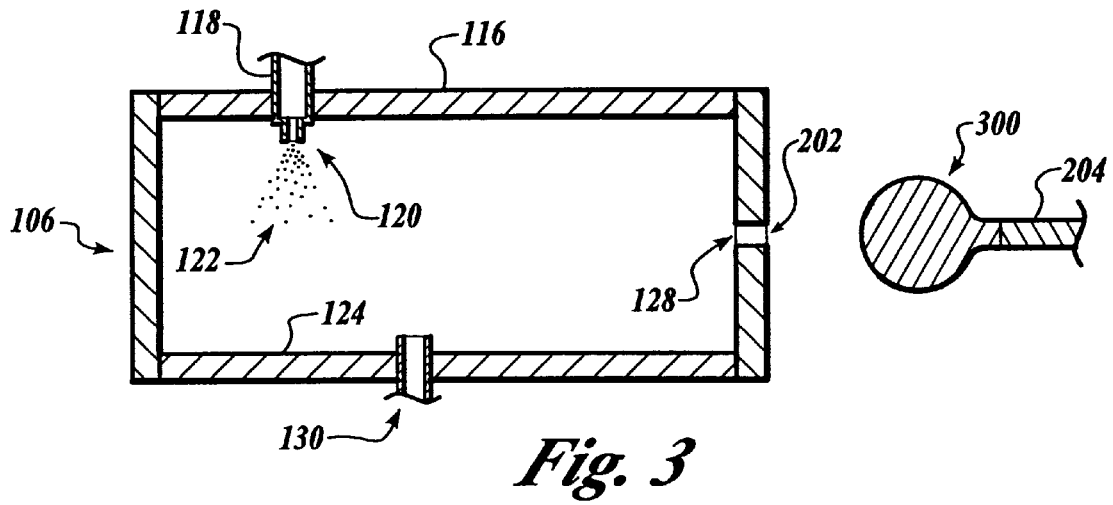

FIG. 3 is a cross section of the present invention wherein the substrate is the electrode.

DESCRIPTION OF THE PREFERRED EMBODIMENT(S)

According to the present invention, the apparatus is shown in FIG. 1. The apparatus and method of the present invention are preferably within a low pressure (vacuum) environment or chamber. Pressures preferably range from about $10^{-1}$ torr to $10^{-6}$ torr. The flash evaporator 106 has a housing 116, with a monomer inlet 118 and an atomizing nozzle 120. Flow through the nozzle 120 is atomized into particles or droplets 122 which strike the heated surface 124 whereupon the particles or droplets 122 are flash evaporated into a gas or evaporate that flows past a series of baffles 126 to an evaporate outlet 128 and cryocondenses on the surface 102. Cryocondensation on the baffles 126 and other internal surface is prevented by heating the baffles 126 and other surfaces to a temperature in excess of a cryocondensation temperature or dew point of the evaporate. Although other gas flow distribution arrangements have been sued, it has been found that the baffles 126 provide adequate gas flow distribution or uniformity while permitting ease of scaling up to large surfaces 102. The evaporate outlet 128 directs gas toward a glow discharge electrode 204 creating a glow discharge plasma from the evaporate. In the embodiment shown in FIG. 2, the glow discharge electrode 204 is placed in a glow discharge housing 200 having an evaporate inlet 202 proximate the evaporate outlet 128. In this embodiment, the glow discharge housing 200 and the glow discharge electrode 204 are maintained at a temperature above a dew point of the evaporate. The glow discharge plasma exits the glow discharge housing 200 and cryocondenses on the surface 102 of the substrate 104. It is preferred that the substrate 104 is kept at a temperature below a dew point of the evaporate, preferably ambient temperature or cooled below ambient temperature to enhance the cryocondensation rate. In this embodiment, the substrate 104 is moving and may be electrically grounded, electrically floating or electrically biased with an impressed voltage to draw charged species from the glow discharge plasma. If the substrate 104 is electrically biased, it may even replace the electrode 204 and be, itself, the electrode which creates the glow discharge plasma from the monomer gas. Electrically floating means that there is no impressed voltage although a charge may build up due to static electricity or due to interaction with the plasma.

A preferred shape of the glow discharge electrode 204, is shown in FIG. 2a. In this preferred embodiment, the glow discharge electrode 204 is separate from the substrate 104 and shaped so that evaporate flow from the evaporate inlet 202 substantially flows through an electrode opening 206. Any electrode shape can be used to create the glow discharge, however, the preferred shape of the electrode 204 does not shadow the plasma from the evaporate issuing from the outlet 202 and its symmetry, relative to the monomer exit slit 202 and substrate 104, provides uniformity of the evaporate vapor flow the plasma across the width of the substrate while uniformity transverse to the width follows from the substrate motion.

The spacing of the electrode 204 from the substrate 104 is a gap or distance that permits the plasma to impinge upon the substrate. This distance that the plasma extends from the electrode will depend on the evaporate species, electrode 204/substrate 104 geometry, electrical voltage and frequency, and pressure in the standard way as described in detail in ELECTRICAL DISCHARGES IN GASSES, F. M. Penning, Gordon and Breach Science Publishers, 1965, and summarized in THIN FILM PROCESSES, J. L. Vossen, W. Kern, editors, Academic Press, 1978, Part, II, Chapter II-1, Glow Discharge Sputter Deposition, both hereby incorporated by reference.

An apparatus suitable for batch operation is shown in FIG. 3. In this embodiment, the glow discharge electrode 204 is sufficiently proximate a part 300 (substrate) that the part 300 is an extension of or part of the electrode 204. Moreover, the part is below a dew point to allow cryocondensation of the glow discharge plasma on the part 300 and thereby coat the part 300 with the monomer condensate and self cure into a polymer layer. Sufficiently proximate may be connected to, resting upon, in direct contact with, or separated by a gap or distance that permits the plasma to impinge upon the substrate. This distance that the plasma extends from the electrode will depend on the evaporate species, electrode 204/substrate 104 geometry, electrical voltage and frequency, and pressure in the standard way sa described in ELECTRICAL DISCHARGES IN GASSES, F. M. Penning, Gordon and Breach Science Publishers, 1965, hereby incorporated by references. The substrate 300 may be stationary or moving during cryocondensation, Moving includes rotation and translation and may be employed for controlling the thickness and uniformity of the monomer layer cryocondensed thereon. Because the cryocondensation occurs rapidly, within milli-seconds to seconds, the part may be removed after coating and before it exceeds a coating temperature limit.

In operation, either as a method for plasma enhanced chemical vapor deposition of low vapor pressure conjugated materials onto a substrate, or as a method for making self-curing conjugated polymer layers (especially PML), the method of the invention has the steps of (a) flash evaporating a conjugated material forming an evaporate; (b) passing the evaporate to a glow discharge electrode crating a glow discharge conjugated monomer plasma from the evaporate; and (c) cryocondensing the glow discharge conjugated monomer plasma on a substrate and crosslinking the glow discharge conjugated monomer plasma thereon. The crosslinking results from radicals created in the glow discharge plasma thereby permitting self curing.

The flash evaporating has the steps of flowing a conjugated material to an inlet, atomizing the conjugated material through a nozzle and creating a plurality of conjugated monomer droplets of the conjugated monomer liquid as a spray. The spray is directed onto a heated evaporation surface whereupon it is evaporated and discharged through an evaporate outlet.

The liquid conjugated material may be any liquid conjugated monomer. However, it is preferred that the liquid conjugated monomer or liquid have a low vapor pressure at ambient temperatures so that it will readily cryocondense. Preferably, the vapor pressure of the liquid conjugated monomer material is less than about 10 torr at 83° F. (28.3° C.), more preferably less than about 1 torr at 83° F. (28.3° C.), and most preferably less than about 10 millitorr at 83° F. (28.3° C.). For conjugated monomers of the same chemical family, conjugated monomers with low vapor pressures usually also have higher molecular weight and are more readily cryocondensible than higher vapor pressure, lower molecular weight conjugated monomers. Liquid conjugated monomer includes but is not limited to phenylacetylene (FIG. 1c).

Alternatively, the conjugated material may be an unconjugated monomer containing conjugated particles or a conjugated monomer with conjugated particles. Unconjugated monomers include but are not limited to (meth)acrylate(s) and combinations thereof.

The conjugated particle(s) may be any insoluble or partially insoluble conjugated particle type having a boiling point below a temperature of the heated surface in the flash evaporation process. Insoluble conjugated particle includes but is not limited to phenyl acetylene triphenyl diamine derivative (TPD, FIG. 1d), quinacridone (QA, FIG. 1e) and combinations thereof. To achieve a conductive polymer it is necessary to dope a conjugated polymer. Doping is with a salt including but not limited to lithium-trifluoromethanesulfonate ($CF_3SO_3Li$), other salts of lithium, salts of iodine, iodine and combinations thereof.

The insoluble conjugated particles are preferably of a volume much less than about 5000 cubic micrometers (diameter about 21 micrometers) or equal thereto, preferably less than or equal to about 4 cubic micrometers (diameter about 2 micrometers). In a preferred embodiment, the insoluble conjugated particles are sufficiently small with respect to particle density and liquid monomer density and viscosity that the settling rate of the conjugated particles within the liquid monomer is several times greater than the amount of time to transport a portion of the particle liquid monomer mixture from a reservoir to the atomization nozzle. It is to be noted that it may be necessary to stir the conjugated particle liquid monomer mixture in the reservoir to maintain suspension of the conjugated particles and avoid settling.

The mixture of monomer and insoluble or partially soluble conjugated particles may be considered a slurry, suspension or emulsion, and the conjugated particles may be solid or liquid. The mixture may be obtained by several methods. One method is to mix insoluble conjugated particles of a specified size into the monomer. The insoluble conjugated particles of a solid of a specified size may be obtained by direct purchase or by making them by one of any standard techniques, including but not limited to milling from large conjugated particles, precipitation from solution, melting/spraying under controlled atmospheres, rapid thermal decomposition of precursors from solution as described in U.S. Pat. No. 5,652,192 hereby incorporated by reference. The steps of U.S. Pat. No. 5,652,192 are making a solution of a soluble precursor in a solvent and flowing the solution through a reaction vessel, pressurizing and heating the flowing solution and forming substantially insoluble conjugated particles, then quenching the heated flowing solution and arresting growth of the conjugated particles. Alteratively, larger sizes of solid conjugated material may be mixed into liquid monomer then agitated, for example ultrasonically, to break the solid conjugated material into conjugated particles of sufficient size.

Liquid conjugated particles may be obtained by mixing an immiscible conjugated liquid with the monomer liquid and agitating by ultrasonic or mechanical mixing to produce liquid conjugated particles within the liquid monomer. Immiscible conjugated liquids include, for example phenylacetylene.

Upon spraying, the droplets may be conjugated particles alone, conjugated particles surrounded by liquid monomer and liquid monomer alone. Since both the liquid monomer and the conjugated particles are evaporated, it is of no consequence either way. It is, however, important that the droplets be sufficiently small that they are completely vaporized. Accordingly, in a preferred embodiment, the droplet size may range from about 1 micrometer to about 50 micrometers.

By using flash evaporation, the conjugated material is vaporized so quickly that reactions that generally occur from heating a liquid conjugated material to an evaporation temperature simply do not occur. Further, control of the rate of evaporate delivery is strictly controlled by the rate of conjugated material delivery to the inlet 118 of the flash evaporator 106.

In addition to the evaporate from the conjugated material, additional gases may be added within the flash evaporator 106 through a gas inlet 130 upstream of the evaporate outlet 128, preferably between the heated surface 124 and the first baffle 126 nearest the heated surface 124. Additional gases may be organic or inorganic for purposes included but not limited to ballast, reaction and combinations thereof. Ballast refers to providing sufficient molecules to keep the plasma lit in circumstances of low evaporate flow rate. Reaction refers to chemical reaction to form a compound different from the evaporate. Additional gases include but are not limited to group VIII of the periodic table, hydrogen, oxygen, nitrogen, chlorine, bromine, polyatomic gases including for example carbon dioxide, carbon monoxide, water vapor, and combinations thereof.

The conjugated polymer is conductive when doped with a dopant for example a salt of iodine, lithium or a combination thereof. The dopant is preferably introduced into the conjugated monomer and carried over with the conjugated monomer during flash evaporation.

Alternative Embodiments

The method of the present invention may obtain a polymer layer either by radiation curing or by self-curing. In radiation curing (FIG. 1), the monomer liquid may include a photoinitiator. In self-curing, a combined flash evaporator, glow discharge plasma generator is used without either the e-beam gun or ultraviolet light.

CLOSURE

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. A method of making a conjugated polymer layer with plasma enhanced chemical vapor deposition of a conjugated material onto a substrate in a vacuum environment, comprising the steps of:

(a) making an evaporate by receiving said conjugated material into a flash evaporation housing, evaporating said conjugated material on an evaporation surface, and discharging an evaporate of said conjugated material through an evaporate outlet;

(b) making a monomer plasma from said evaporate by passing said evaporate proximate a glow discharge electrode and creating a glow discharge for making said plasma from the evaporate; and (c) cryocondensing said monomer plasma onto said substrate;

wherein said conjugated material is selected from the liquid conjugated monomer phenylacetylene, a liquid unconjugated monomer containing conjugated particles selected from the group consisting of triphenyl diamine derivatives, quinacridone and combinations thereof, or said liquid conjugated monomer containing said conjugated particles.

2. A method for making conjugated polymer layers in a vacuum chamber, comprising:

(a) flash evaporating a conjugated material forming an evaporate;

(b) passing said evaporate to a glow discharge electrode creating a glow discharge conjugated monomer plasma from the evaporate; and (c) condensing said glow discharge conjugated plasma on a substrate as a condensed conjugated monomer and crosslinking said said condensed conjugated monomer thereon without a separate curing step, said crosslinking resulting from radicals created in said glow discharge plasma wherein said conjugated material is selected from the liquid conjugated monomer phenylacetylene, a liquid unconjugated monomer containing conjugated particles selected from the group consisting of triphenyl diamine derivatives, quinacridone and combinations thereof, or said liquid conjugated monomer containing said conjugated particles.

3. A method of making a conjugated polymer layer with plasma enhanced chemical vapor deposition of a conjugated material onto a substrate in a vacuum environment, comprising the steps of:

(a) making an evaporate by receiving said conjugated material into a flash evaporation housing, evaporating said conjugated material on an evaporation surface, and discharging an evaporate of said conjugated material through an evaporate outlet;

(b) making a monomer plasma from said evaporate by passing said evaporate proximate a glow discharge electrode and creating a glow discharge for making said plasma from the evaporate; and (c) cryocondensing said monomer plasma onto said substrate;

wherein said conjugated material is selected from the liquid conjugated monomer phenylacetylene, or the liquid conjugated monomer phenylacetylene containing conjugated particles.

4. The method as recited in claim 3, wherein the substrate is proximate the glow discharge electrode and is electrically biased with an impressed voltage, and wherein the monomer plasma cryocondenses on said substrate.

5. The method as recited in claim 3, wherein said glow discharge electrode is positioned within a glow discharge housing having an evaporate inlet proximate the evaporate outlet, said glow discharge housing and said glow discharge electrode maintained at a temperature above a dew point of said evaporate and said substrate is downstream of said monomer plasma, electrically floating, and wherein the monomer plasma cryocondenses on said substrate.

6. The method as recited in claim 3, wherein the substrate is proximate the glow discharge electrode and is electrically grounded, and wherein the monomer plasma cryocondenses on said substrate.

7. The method as recited in claim 3, wherein said substrate is cooled.

8. The method as recited in claim 3, further comprising adding an additional gas within said flash evaporation housing.

9. The method as recited in claim 8, wherein said additional gas is a ballast gas.

10. The method as recited in claim 8, wherein said additional gas is a reaction gas.

11. The method as recited in claim 3, further comprising adding a dopant to said conjugated material.

12. The method as recited in claim 11, wherein said dopant is selected from the group consisting of iodine, salts of iodine, salts of lithium and combinations thereof.

13. The method as recited in claim 3, further comprising adding a dopant to said conjugated material so that said conjugated polymer layer is an electrically conductive layer.

14. The method as recited in claim 3, wherein said conjugated particles are selected from the group consisting of organic solids, liquids, and combinations thereof.

15. The method as recited in claim 3, wherein said organic solids are selected from the group consisting of triphenyl diamine derivatives, quinacridone, and combinations thereof.

16. A method of making a conjugated polymer layer with plasma enhanced chemical vapor deposition of a conjugated material onto a substrate in a vacuum environment, comprising the steps of:
(a) making an evaporate by receiving said conjugated material into a flash evaporation housing, evaporating said conjugated material on an evaporation surface, and discharging an evaporate of said conjugated material through an evaporate outlet;
(b) making a monomer plasma from said evaporate by passing said evaporate proximate a glow discharge electrode and creating a glow discharge for making said plasma from the evaporate; and
(c) cryocondensing said monomer plasma onto said substrate;
wherein said conjugated material is selected from a liquid unconjugated monomer containing conjugated particles selected from the group consisting of triphenyl diamine derivatives, quinacridone and combinations thereof, or a liquid conjugated monomer containing said conjugated particles.

17. The method as recited in claim 16 wherein the substrate is proximate the glow discharge electrode and is electrically biased with an impressed voltage, and wherein the monomer plasma cryocondenses on said substrate.

18. The method as recited in claim 16, wherein said glow discharge electrode is positioned within a glow discharge housing having an evaporate inlet proximate the evaporate outlet, said glow discharge housing and said glow discharge electrode maintained at a temperature above a dew point of said evaporate and said substrate is downstream of said monomer plasma,, electrically floating, and wherein the monomer plasma cryocondenses on said substrate.

19. The method as recited in claim 16, wherein the substrate is proximate the glow discharge electrode and is electrically grounded, and wherein the monomer plasma cryocondenses on said substrate.

20. The method as recited in claim 16, wherein said substrate is cooled.

21. The method as recited in claim 16, further comprising adding an additional gas within said flash evaporation housing.

22. The method as recited in claim 21, wherein said additional gas is a ballast gas.

23. The method as recited in claim 21, wherein said additional gas is a reaction gas.

24. The method as recited in claim 16, further comprising adding a dopant to said conjugated material.

25. The method as recited in claim 24, wherein said dopant is selected from the group consisting of iodine, salts of iodine, salts of lithium and combinations thereof.

26. The method as recited in claim 16, wherein said liquid conjugated monomer comprises phenylacetylene.

27. The method as recited in claim 16, further comprising adding a dopant to said conjugated material so that said conjugated polymer layer is an electrically conductive layer.

28. A method for making conjugated polymer layers in a vacuum chamber, comprising:
(a) flash evaporating a conjugated material forming an evaporate;
(b) passing said evaporate to a glow discharge electrode creating a glow discharge conjugated monomer plasma from the evaporate; and
(c) condensing said glow discharge conjugated plasma on a substrate as a condensed conjugated monomer and crosslinking said condensed conjugated monomer thereon without a separate curing step, said crosslinking resulting from radicals created in said glow discharge plasma wherein said conjugated material is selected from the liquid conjugated monomer phenylacetylene, or the liquid conjugated monomer phenylacetylene containing conjugated particles.

29. The method as recited in claim 28, wherein the substrate is proximate the glow discharge electrode and is electrically biased with an impressed voltage, and wherein the monomer plasma cryocondenses on said substrate.

30. The method as recited in claim 28, wherein said glow discharge electrode is positioned within a glow discharge housing having an evaporate inlet proximate the evaporate outlet, said glow discharge housing and said glow discharge electrode maintained at a temperature above a dew point of said evaporate and said substrate is downstream of said monomer plasma, electrically floating, and wherein the monomer plasma cryocondenses on said substrate.

31. The method as recited in claim 28, wherein the substrate is proximate the glow discharge electrode and is electrically grounded, and wherein the monomer plasma cryocondenses on said substrate.

32. The method as recited in claim 28, wherein said substrate is cooled.

33. The method as recited in claim 28, further comprising adding a dopant to said conjugated material.

34. The method as recited in claim 33, wherein said dopant is selected from the group consisting of iodine, salts of iodine, salts of lithium and combinations thereof.

35. The method as recited in claim 28, wherein said conjugated particles are selected from the group consisting of organic solids, liquids, and combinations thereof.

36. The method as recited in claim 35, wherein said organic solids are selected from the group consisting of triphenyl diamine derivative, quinacridone, and combinations thereof.

37. The method as recited in claim 28, wherein the flash evaporating occurs in a flash evaporation housing and further comprising adding an additional gas within said flash evaporation housing.

38. The method as recited in claim 37, wherein said additional gas is a ballast gas.

39. The method as recited in claim 37, wherein said additional gas is a reaction gas.

40. A method for making conjugated polymer layers in a vacuum chamber, comprising:

(a) flash evaporating a conjugated material forming an evaporate;

(b) passing said evaporate to a glow discharge electrode creating a glow discharge conjugated monomer plasma from the evaporate; and (c) condensing said glow discharge conjugated plasma on a substrate as a condensed conjugated monomer and crosslinking said condensed conjugated monomer thereon without a separate curing step, said crosslinking resulting from radicals created in said glow discharge plasma wherein said conjugated material is selected from a liquid unconjugated monomer containing conjugated particles selected from the group consisting of triphenyl diamine derivatives, quinacridone and combinations thereof, or a liquid conjugated monomer containing said conjugated particles.

41. The method as recited in claim 40, wherein the substrate is proximate the glow discharge electrode and is electrically biased with an impressed voltage, and wherein the monomer plasma cryocondenses on said substrate.

42. The method as recited in claim 40, wherein said glow discharge electrode is positioned within a glow discharge housing having an evaporate inlet proximate the evaporate outlet, said glow discharge housing and said glow discharge electrode maintained at a temperature above a dew point of said evaporate and said substrate is downstream of said monomer plasma,, electrically floating, and wherein the monomer plasma cryocondenses on said substrate.

43. The method as recited in claim 40, wherein the substrate is proximate the glow discharge electrode and is electrically grounded, and wherein the monomer plasma cryocondenses on said substrate.

44. The method as recited in claim 40, wherein said substrate is cooled.

45. The method as recited in claim 40, wherein the flash evaporating occurs in a flash evaporation housing and further comprising adding an additional gas within said flash evaporation housing.

46. The method as recited in claim 45, wherein said additional gas is a ballast gas.

47. The method as recited in claim 45, wherein said additional gas is a reaction gas.

48. The method as recited in claim 40, further comprising adding a dopant to said conjugated material.

49. The method as recited in claim 48, wherein said dopant is selected from the group consisting of iodine, salts of iodine, salts of lithium and combinations thereof.

50. The method as recited in claim 40, wherein the liquid conjugated monomer comprises phenylacetylene.

51. The method as recited in claim 40, further comprising adding a dopant to said conjugated material so that said conjugated polymer layer is an electrically conductive layer.

* * * * *

UNITED STATES PATENT AND TRADEMARK OFFICE
CERTIFICATE OF CORRECTION

PATENT NO.    : 6,207,239 B1
DATED         : March 27, 2001
INVENTOR(S)   : John D. Affinito It is certified that error appears in the above-identified patent and that said Letters Patent is hereby corrected as shown below:

Column 1,
Line 42, "dichlorotetra-methyidisiloxane" should be -- dichlorotetra-methyldisiloxane --;

Column 3,
Line 2, "vis(1" should be -- vis (1) --;

Column 4,
Line 20, "shown in Fig. 1" should be -- shown in Fig. 2 --;
Line 34, "have been sued," should be -- have been used, --;

Column 5,
Line 4, "vapor flow the plasma" should be -- vapor flow to the plasma --;
Line 16, "Part, II," should be -- Part II, --;
Line 32, "way sa described" should be -- way as described --;
Line 35, "by references" should be -- by reference --;
Line 36, "cryocondensation," should be -- crycondensation. --; and
Line 49, "electrode crating" should be -- electrode creating --.

Signed and Sealed this

Twelfth Day of November, 2002

Attest:

*Attesting Officer*

JAMES E. ROGAN
*Director of the United States Patent and Trademark Office*